United States Patent
Wang et al.

(10) Patent No.: US 12,432,427 B2
(45) Date of Patent: *Sep. 30, 2025

(54) TIMELINE FOR MEDIA CONTENT PLAYBACK

(71) Applicant: Comcast Cable Communications, LLC, Philadelphia, PA (US)

(72) Inventors: Hongcheng Wang, Arlington, VA (US); Jan Neumann, Arlington, VA (US); Jonghyun Choi, North Bethesda, MD (US)

(73) Assignee: Comcast Cable Communications, LLC, Philadelphia, PA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/487,855

(22) Filed: Sep. 28, 2021

(65) Prior Publication Data

US 2022/0021952 A1    Jan. 20, 2022

Related U.S. Application Data

(63) Continuation of application No. 16/103,382, filed on Aug. 14, 2018, now Pat. No. 11,172,272.

(60) Provisional application No. 62/545,210, filed on Aug. 14, 2017.

(51) Int. Cl.
*H04N 21/8549* (2011.01)
*H04L 9/32* (2006.01)
*H04N 21/482* (2011.01)
*H04N 21/8547* (2011.01)

(52) U.S. Cl.
CPC ....... *H04N 21/8549* (2013.01); *H04L 9/3236* (2013.01); *H04N 21/4826* (2013.01); *H04N 21/8547* (2013.01)

(58) Field of Classification Search
CPC .......... H04N 21/8549; H04N 21/4826; H04N 21/8547; H04L 9/3236
See application file for complete search history.

(56) References Cited

U.S. PATENT DOCUMENTS

| 8,229,219 | B1 | 7/2012 | Ioffe | |
|---|---|---|---|---|
| 8,332,530 | B2 | 12/2012 | Wei et al. | |
| 2008/0263046 | A1* | 10/2008 | Kristensson | H04M 1/72403 707/999.009 |
| 2008/0309819 | A1* | 12/2008 | Hardacker | G11B 27/28 348/553 |

(Continued)

OTHER PUBLICATIONS

Shot transition detection, Wikipedia, retrieved Oct. 23, 2018 from https://en.wikipedia.org/wiki/Shot_transition_detection, 5 pages.

(Continued)

*Primary Examiner* — John W Miller
*Assistant Examiner* — Akshay Doshi
(74) *Attorney, Agent, or Firm* — Banner & Witcoff, Ltd.

(57) ABSTRACT

Methods, systems, and apparatuses are described for identifying highlights of a content item. A media clip may be obtained from a content sharing service. The media clip may correspond to a media content. A portion of the media content that is included in the media clip may be determined, and a popularity value of the media clip may be obtained from the content sharing service. A popularity metric for the portion of the media content may be determined and displayed.

18 Claims, 8 Drawing Sheets

(56) References Cited

U.S. PATENT DOCUMENTS

| | | | |
|---|---|---|---|
| 2009/0199251 A1* | 8/2009 | Badoiu | G06Q 30/02 725/105 |
| 2010/0071013 A1 | 3/2010 | Vandermolen et al. | |
| 2011/0145726 A1* | 6/2011 | Wei | H04N 21/252 715/752 |
| 2012/0215903 A1 | 8/2012 | Fleischman et al. | |
| 2014/0201227 A1* | 7/2014 | Hamilton-Dick | G06F 16/9535 707/758 |
| 2014/0325552 A1* | 10/2014 | Evans | G06F 16/9558 725/28 |
| 2015/0095937 A1 | 4/2015 | Tobin | |
| 2015/0235672 A1* | 8/2015 | Cudak | H04N 21/252 386/241 |
| 2015/0301718 A1* | 10/2015 | Trollope | G06F 16/632 715/716 |
| 2017/0041684 A1* | 2/2017 | Krishnamurthy | H04N 21/233 |
| 2017/0187772 A1* | 6/2017 | Paul | H04N 21/44226 |
| 2018/0084310 A1* | 3/2018 | Katz | G06N 3/045 |

OTHER PUBLICATIONS

Example of search by title, keyword "Avatar" on ChapterDb.org from http://chapterdb.org/browse?title=avatar, retrieved Oct. 23, 2018, 1 page.

Lesson: Search and discovery on Youtube, Youtube Creators, retrieved Oct. 23, 2018 from https://youtube.com/creatoracademy/page/lesson/discovery?hl=en#yt-creators-strategies-1, 11 pages.

Automatic summarization, Wikipedia, retrieved Oct. 23, 2018 from https://en.wikipedia.org/wiki/Automatic_summarization, 15 pages.

TV Tropes, Wikipedia, retrieved Oct. 23, 2018 from https://en.wikipedia.org/wiki/TV_Tropes#Ownership, 7 pages.

Noise (audio), Wikipedia, retrieved Oct. 23, 2018 from https://en.wikipedia.org/wiki/Noise_(audio), 7 pages.

Abstract, "State-of-the-art and future challenges in video scene detection: a survey", Del Fabro, M. & Böszörmenyi, L. Multimedia Systems (2013), vol. 19, Issue 5, retrieved Oct. 23, 2018 from https://link.springer.com/article/10.1007/s00530-013-0306-4, 23 pages.

* cited by examiner

TIMELINE FOR MEDIA CONTENT PLAYBACK

CROSS-REFERENCE TO RELATED APPLICATIONS

This application claims priority to U.S. application Ser. No. 16/103,382, titled "Determining Video Highlights and Chaptering" and filed Aug. 14, 2018, which claims the benefit of U.S. Provisional Application No. 62/545,210, titled "Determining Video Highlights and Chaptering" and filed on Aug. 14, 2017, the disclosures of which are hereby incorporated by reference in their entireties.

BACKGROUND

Users are often interested in a portion of a TV show or movie. For example, a user may wish to view a specific clip from a late night television show or highlights of a sporting event. Similarly, users may wish to see their favorite scenes from a movie rather than watching the entire movie. It may be difficult for content producers to identify portions or clips of a video that users are most interested in viewing, or that will be the most popular and provide access to those identified clips to viewers.

In some instances, users may utilize chapters to navigate various portions of a video, such as when viewing a video on a laser-based storage medium. However, various formats of a video may have different framerates, or different lengths; thus, chapters may be located at different times in the different formats of the video. It may be difficult for content producers to therefore identify and mark chapters of a video.

SUMMARY

The following summary presents a simplified summary of certain features. The summary is not an extensive overview and is not intended to identify key or critical elements.

Methods, systems, and apparatuses are described for identifying popular clips within a video content based at least on aggregated metadata obtained from various video sharing websites. Clips or portions of a movie or television show may be shared on various video sharing websites or other sharing platforms. Metadata associated with the shared clips may be obtained and aggregated to determine portions of the video content that are popular or most shared. The portions of the video content from the shared clips may be marked as a popular portion of the content item and access to the popular portions may be simplified for viewers of the content item. Identified clips may also be aligned with shot boundaries within the video content. In addition, chapter information (such as chapter titles) may also be added to a content item. Different versions of the content item may be aligned, such as based on chapter time stamps and/or shot boundaries, and the chapter information may be transferred from one version of the content item to the other. The chapter information may also be provided for simplified navigation within the video content.

These and other features are described in greater detail below.

BRIEF DESCRIPTION OF THE DRAWINGS

Some features are shown by way of example, and not by limitation, in the accompanying drawings. In the drawings, like numerals reference similar elements.

DETAILED DESCRIPTION

The accompanying drawings, which form a part hereof, show examples of the disclosure. It is to be understood that the examples shown in the drawings and/or discussed herein are non-exclusive and that there are other examples of how the disclosure may be practiced.

Figure 1:
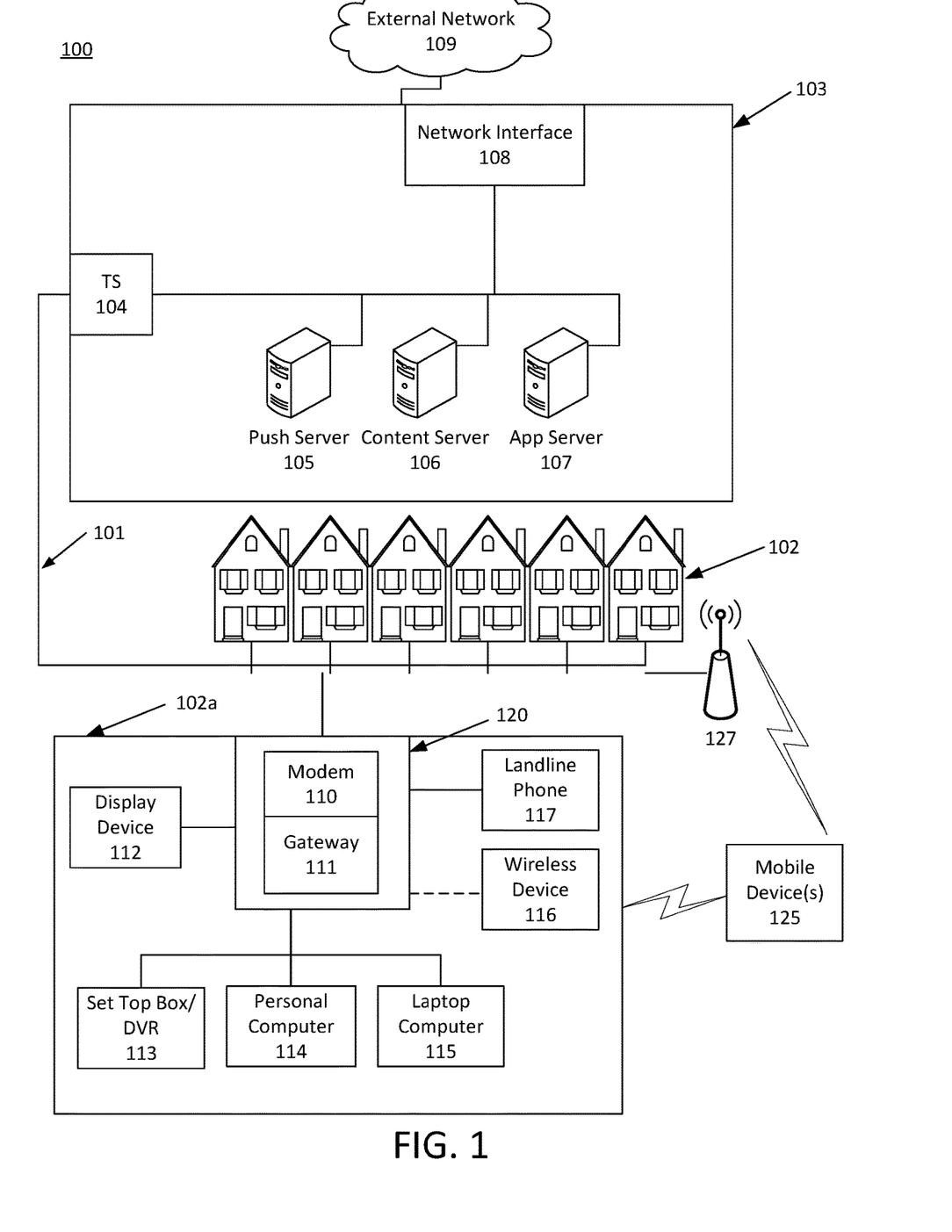
FIG. 1 shows an example communication network on which various features described herein may be implemented.

FIG. 1 shows an example communication network 100 in which features described herein may be implemented. The communication network 100 may be any type of information distribution network, such as satellite, telephone, cellular, wireless, etc. Examples may include an optical fiber network, a coaxial cable network, and/or a hybrid fiber/coax distribution network. The communication network 100 may use a series of interconnected communication links 101 (e.g., coaxial cables, optical fibers, wireless links, etc.) to connect multiple premises 102 (e.g., businesses, homes, consumer dwellings, train stations, airports, etc.) to a local office 103 (e.g., a headend). The local office 103 may transmit downstream information signals and receive upstream information signals via the communication links 101. Each of the premises 102 may have equipment, described below, to receive, send, and/or otherwise process those signals.

Communication links 101 may originate from the local office 103 and may be split to exchange information signals with the various premises 102. The communication links 101 may include components not illustrated, such as splitters, filters, amplifiers, etc. to help convey the signal clearly. The communication links 101 may be coupled to an access point 127 (e.g., a base station of a cellular network, a Wi-Fi access point, etc.) configured to provide wireless communication channels to communicate with one or more mobile devices 125. The mobile devices 125 may include cellular mobile devices, and the wireless communication channels may be Wi-Fi IEEE 802.11 channels, cellular channels (e.g., LTE), and/or satellite channels.

The local office 103 may include an interface 104, such as a termination system (TS). The interface 104 may be a cable modem termination system (CMTS), which may be a computing device configured to manage communications between devices on the network of the communication links 101 and backend devices such as servers 105-107. The interface 104 may be configured to place data on one or more downstream frequencies to be received by modems at the various premises 102, and to receive upstream communications from those modems on one or more upstream frequencies.

The local office 103 may also include one or more network interfaces 108 which may permit the local office 103 to communicate with various other external networks 109. The external networks 109 may include, for example, networks of Internet devices, telephone networks, cellular telephone networks, fiber optic networks, local wireless networks (e.g., WiMAX), satellite networks, and any other desired network, and the network interface 108 may include the corresponding circuitry needed to communicate on the external networks 109, and to other devices on the external networks. For example, the local office 103 may also or alternatively communicate with a cellular telephone network and its corresponding mobile devices 125 (e.g., cell phones, smartphone, tablets with cellular radios, laptops communicatively coupled to cellular radios, etc.) via the interface 108.

The push notification server 105 may generate push notifications to deliver data and/or commands to the various premises 102 in the network (or more specifically, to the devices in the premises 102 that are configured to detect such notifications). The content server 106 may be one or more computing devices that are configured to provide content to devices at premises. This content may be, for example, video on demand movies, television programs, songs, text listings, web pages, articles, news, images, files, etc. The content server 106 (or, alternatively, an authentication server) may include software to validate user identities and entitlements, to locate and retrieve requested content and to initiate delivery (e.g., streaming) of the content to the requesting user(s) and/or device(s). The application server 107 may be a computing device configured to offer any desired service, and may execute various languages and operating systems (e.g., servlets and JSP pages running on Tomcat/MySQL, OSX, BSD, Ubuntu, Redhat, HTML5, JavaScript, AJAX and COMET). For example, an application server may be responsible for collecting television program listings information and generating a data download for electronic program guide listings. Another application server may be responsible for monitoring user viewing habits and collecting that information for use in selecting advertisements. Yet another application server may be responsible for formatting and inserting advertisements in a video stream being transmitted to the premises 102. The servers 105, 106, and 107, and/or other servers, may be computing devices and may include memory storing data and also storing computer executable instructions that, when executed by one or more processors, cause the server(s) to perform steps described herein.

An example premise 102a may include an interface 120. The interface 120 may include any communication circuitry used to communicate via one or more of the links 101. The interface 120 may include a modem 110, which may include transmitters and receivers used to communicate via the links 101 with the local office 103. The modem 110 may be, for example, a coaxial cable modem (for coaxial cable lines of the communication links 101), a fiber interface node (for fiber optic lines of the communication links 101), twisted-pair telephone modem, cellular telephone transceiver, satellite transceiver, local Wi-Fi router or access point, or any other desired modem device. One modem is shown in FIG. 1, but a plurality of modems operating in parallel may be implemented within the interface 120. The interface 120 may include a gateway interface device 111. The modem 110 may be connected to, or be a part of, the gateway interface device 111. The gateway interface device 111 may be a computing device that communicates with the modem(s) 110 to allow one or more other devices in the premises 102a, to communicate with the local office 103 and other devices beyond the local office 103. The gateway interface device 111 may comprise a set-top box (STB), digital video recorder (DVR), a digital transport adapter (DTA), computer server, and/or any other desired computing device. The gateway interface device 111 may also include local network interfaces to provide communication signals to requesting entities/devices in the premises 102a, such as display devices 112 (e.g., televisions), additional STBs or DVRs 113, personal computers 114, laptop computers 115, wireless devices 116 (e.g., wireless routers, wireless laptops, notebooks, tablets and netbooks, cordless phones (e.g., Digital Enhanced Cordless Telephone—DECT phones), mobile phones, mobile televisions, personal digital assistants (PDA), etc.), landline phones 117 (e.g. Voice over Internet Protocol—VoIP phones), and any other desired devices. Examples of the local network interfaces include Multimedia Over Coax Alliance (MoCA) interfaces, Ethernet interfaces, universal serial bus (USB) interfaces, wireless interfaces (e.g., IEEE 802.11, IEEE 802.15), analog twisted pair interfaces, Bluetooth interfaces, and others.

One or more of the devices at a premise 102a may be configured to provide wireless communications channels (e.g., IEEE 802.11 channels) to communicate with a mobile device 125. A modem 110 (e.g., access point) or a wireless device 116 (e.g., router, tablet, laptop, etc.) may wirelessly communicate with one or more mobile devices 125, which may be on- or off-premises.

Mobile devices 125 may communicate with a local office 103. Mobile devices 125 may be cell phones, smartphones, tablets (e.g., with cellular transceivers), laptops (e.g., communicatively coupled to cellular transceivers), wearable devices (e.g., smart watches, electronic eye-glasses, etc.), or any other mobile computing devices. Mobile devices 125 may store, output, and/or otherwise use assets. An asset may be a video, a game, one or more images, software, audio, text, webpage(s), and/or other content. Mobile devices 125 may include Wi-Fi transceivers, cellular transceivers, satellite transceivers, and/or global positioning system (GPS) components.

As described in more detail below with reference to FIGS. 3-8, the content servers 106 may transmit a content item to one or more of the devices 110-117. Portions of the content item may be associated with metadata, such as metadata that has been imported from shared videos indicating a popularity of the portions of the content item. In one example, the portions of the content item may be indicated as highlights or popular portions of the content item and access to those portions may be provided to a user of the devices 110-117. In another example, the content item may be segmented into chapters based on received chapter information.

Figure 2:
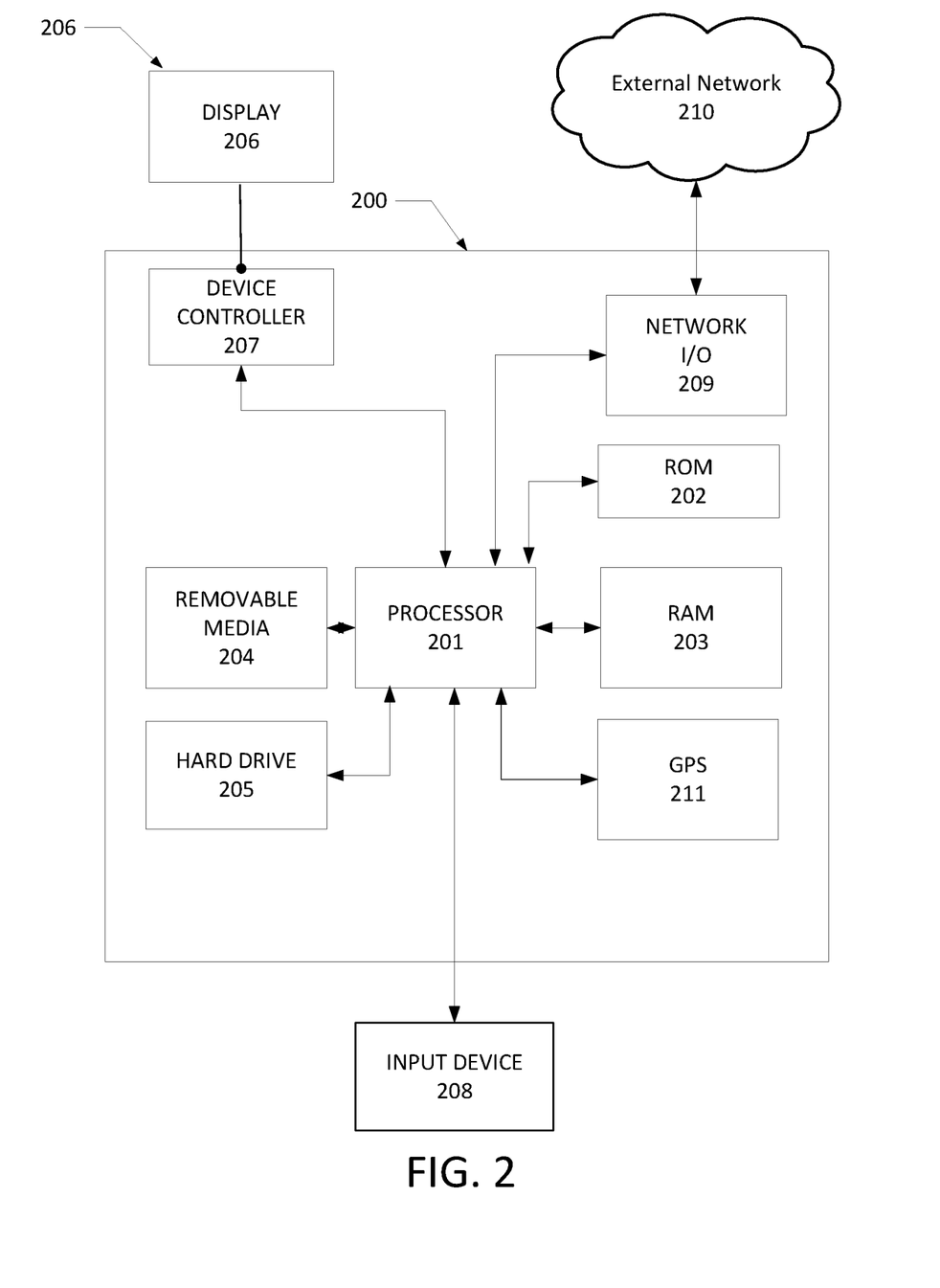
FIG. 2 shows an example computing device that may be used to implement any of the methods described herein.

FIG. 2 shows hardware elements of a computing device that may be used to implement any of the computing devices discussed herein (e.g., a computing device to aggregate metadata from various media sites of portions of a content item and associate those portions with the content item). The computing device 200 may include one or more processors 201, which may execute instructions of a computer program to perform any of the functions described herein. The instructions may be stored in a read-only memory (ROM) 202, random access memory (RAM) 203, removable media 204 (e.g., a Universal Serial Bus (USB) drive, a compact disk (CD), a digital versatile disk (DVD)), and/or in any other type of computer-readable medium or memory.

Instructions may also be stored in an attached (or internal) hard drive 205 or other types of storage media. The computing device 200 may include one or more output devices, such as a display 206 (e.g., an external television or other display device), and may include one or more output device controllers 207, such as a video processor. There may also be one or more user input devices 208, such as a remote control, keyboard, mouse, touch screen, microphone, etc. The computing device 200 may also include one or more network interfaces, such as a network input/output (I/O) circuit 209 (e.g., a network card) to communicate with an external network 210. The network input/output circuit 209 may be a wired interface, wireless interface, or a combination of the two. The network input/output circuit 209 may include a modem (e.g., a cable modem), and the external network 210 may include the communication links 101 discussed above, the external network 109, an in-home network, a network provider's wireless, coaxial, fiber, or hybrid fiber/coaxial distribution system (e.g., a DOCSIS network), or any other desired network. Additionally, the device may include a location-detecting device, such as a global positioning system (GPS) microprocessor 211, which can be configured to receive and process global positioning signals and determine, with possible assistance from an external server and antenna, a geographic position of the device.

Although FIG. 2 shows an example hardware configuration, one or more of the elements of the computing device 200 may be implemented as software or a combination of hardware and software. Modifications may be made to add, remove, combine, divide, etc. components of the computing device 200. Additionally, the elements shown in FIG. 2 may be implemented using basic computing devices and components that have been configured to perform operations such as are described herein. For example, a memory of the computing device 200 may store computer-executable instructions that, when executed by the processor 201 and/or one or more other processors of the computing device 200, cause the computing device 200 to perform one, some, or all of the operations described herein. Such memory and processor(s) may also or alternatively be implemented through one or more Integrated Circuits (ICs). An IC may be, for example, a microprocessor that accesses programming instructions or other data stored in a ROM and/or hardwired into the IC. For example, an IC may comprise an Application Specific Integrated Circuit (ASIC) having gates and/or other logic dedicated to the calculations and other operations described herein. An IC may perform some operations based on execution of programming instructions read from ROM or RAM, with other operations hardwired into gates or other logic. Further, an IC may be configured to output image data to a display buffer.

Figure 3:
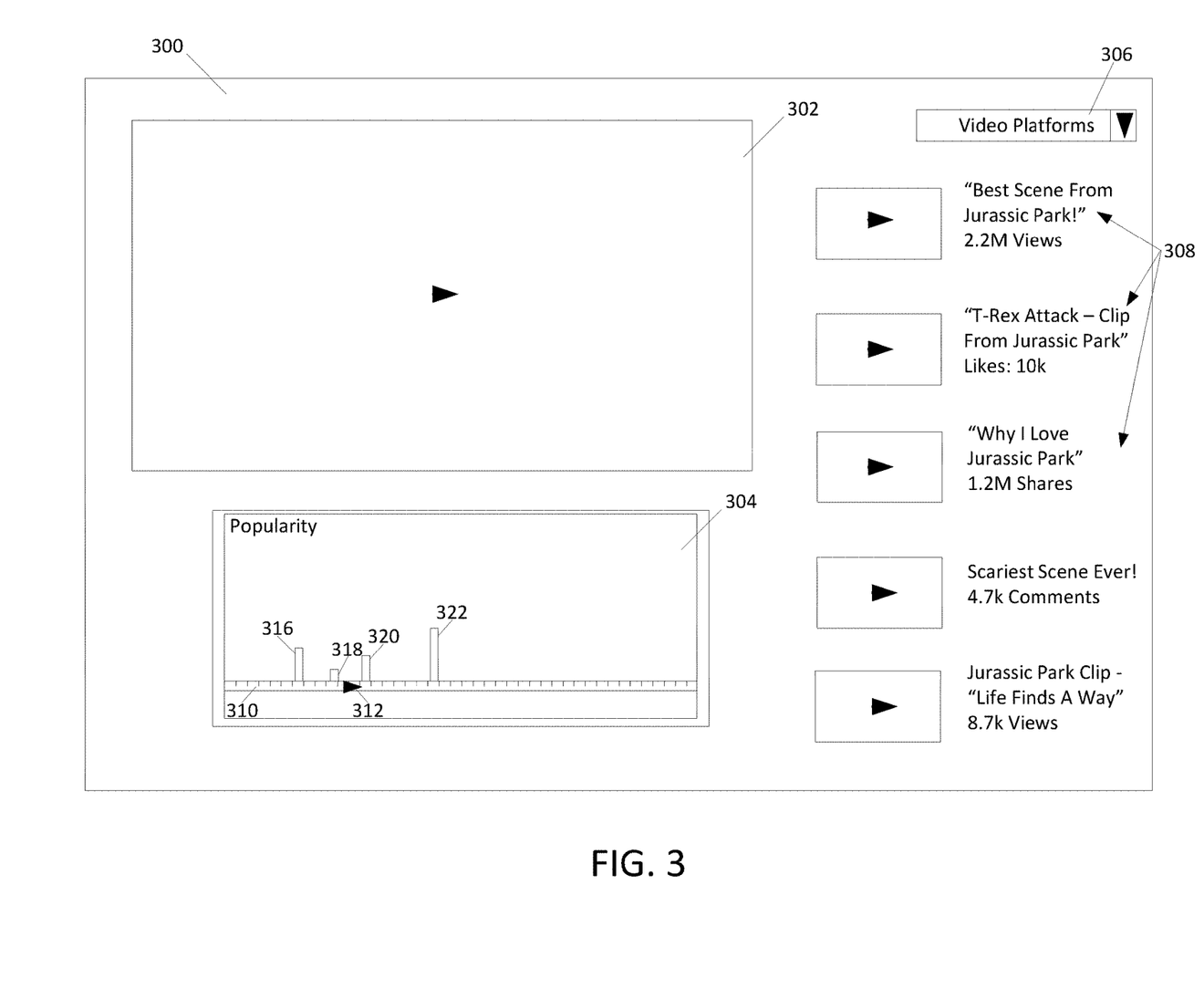
FIG. 3 shows an example user interface for displaying a content item with a heat map of popular portions within the content item.

Through the systems, apparatus, and devices discussed, portions of a multimedia content item, such as a movie, television program, song, etc. and referred to herein as "clips", may be identified as of potential interest to a consumer of the content and quick navigation to such clips may be provided within a navigation interface. FIG. 3 shows one example user interface 300 for displaying a content item with a heat map 304 of popular portions within the content item. In general, a "heat map" may indicate a normalized popularity of different portions of a program and provide an interface through which those popular portions of the program may be accessed. For example, the heat map 304 of a late-night talk show program may indicate that the opening monologue is the most popular portion of the program, with the rest of the show being less popular. In another example, a particular scene within a movie may be indicated in the heat map 304 for that content as popular. Through an interaction with the heat map 304 of the user interface 300, a user may select to view the popular clips of the program. Thus, a user may select to view (or "jump") the opening monologue of the talk show program without having fast forward through the program to the point in the program at which the monologue starts. Similarly, a user may select to view popular scenes from a movie program based on information and links to the scenes provided in the heat map 304. The heat map 304 may include a timeline corresponding to the duration of a program, and may indicate the relative popularity of different portions of the program so that the user may select which clip to view. The heat map 304 thus provides a user quick access to popular portions of content items.

To generate the information presented in the heat map 304 interface, the systems, apparatus, and devices discussed may utilize one or more multimedia sharing platforms, such as video sharing websites, music sharing websites, public or private databases of multimedia files, etc. By accessing the sharing platforms, popular clips within a video or other type of multimedia content may be identified based on aggregated popularity metadata obtained from various video sharing websites. For example, clips from a video content may be uploaded and shared on a sharing platform. The sharing platform may be searched for those clips corresponding to the sharing platform and popularity metadata available from the sharing platform may be obtained. Through the aggregation of such metadata over several clips and/or sharing platforms, an identification of the video content portions that are most shared and/or popular may be determined. The identification of these popular clips and the relative location within the content item may be illustrated in the corresponding heat map 304 for the item. Further, navigation to view the clip within the video content may be provided through the heat map 304 or any other user interface. The identification of clips on sharing platforms, aggregating of metadata from the sharing platforms, and generation of the heat map 304 of a content item is discussed in more detail below.

The user interface 300 of FIG. 3 includes several portions associated with a content item. For example, a content display area 302 may be included in the interface that displays the content item, such as broadcast video content item or a Video On Demand (VOD) content item. Interactions with the content display area 302, such as a selection within the pane with an input device like a mouse or remote control, may play the video content for viewing. In addition, a heat map 304 associated with the video content displayed in the content display area 302 may be displayed within the user interface 300. In some instances, the heat map 304 may be overlaid on the content display area 302. As described, the heat map 304 may include a time bar 310 with one or more locations 316-322 within the video content indicated on the time bar. For example, the length of the time bar 310 may correspond to the length of the video content. The locations of on the time bar 310 may be locations within the content item determined to be highlight portions or clips of the content item. The current location, or video time, within the displayed content item may be marked by location marker 312. Each of the vertical bars 316-322 of the heat map 304 may indicate a location of an identified highlight in the first content item obtained from one or more sharing platforms described above. Further, the height of each of the vertical bars 316-322 of the timeline may represent a relative or normalized popularity of the highlight. In the illustrated example, a taller bar 322 may indicated that the highlight is more popular than a shorter bar 318. Popularity of a highlight or portion of the content item may be determined as described herein, such as based on a number of shared video clips that comprise the portion, or based on a number of comments or likes for shared videos comprising the portion. The popularity of a highlight portion of the content item may also be represented by the color of the vertical bars 316-322. For example, more popular highlight portions of the content item may be represented with darker, warm hues such as red, orange, and yellow. Less popular highlight portions may be represented with cool hues such as blue, green, or violet.

Interactions with the heat map 304 through an input device may provide additional information and/or navigation options. For example, selecting one of the vertical bars 316-322 may initiate playing the video content at the location within the content associated with the vertical bar. In this manner, highlights or clips of the video content may be accessed directly from the heat map 304. In another example, hovering or selecting a vertical bar 316-322 may provide information of the clip, such as a screenshot of a portion of the clip, a clip length, a text description of the clip (e.g., "monologue"), and the like. Additional selection of the vertical bar 316-322 may then navigate to the corresponding clip for viewing in the content display area 302.

As discussed, the clips for the video content may be based on information obtained from one or more video sharing platforms. For example, clips or portions of the video content may be shared on YOUTUBE™ or other publicly available websites. To determine which portions of the video content is displayed in the heat map 304, such sharing platforms may be accessed to obtain the clips and other information. Locations indicated on the heat map 304 may, in some cases, be displayed if a predetermined popularity threshold is met. For example, a location may have a vertical bar if a popularity metric associated with that location rises above a threshold, or predetermined amount, such as over 100,000 views of the clip on the sharing platform. In this example, if the popularity metric indicates that over 100,000 users have viewed a shared video corresponding to a portion of the content item, then the location corresponding to that portion may have a vertical bar indicating that the portion is a highlight. The obtaining and analyzing of highlights from one or more sharing platforms are discussed in more detail below.

The user interface 300 may also include links 308 to the sharing platforms from which the video clips are obtained and/or analyzed. For example, searching a first sharing platform for clips of the video content may return five videos shared among the users of the platform. Uniform Resource Locators (URLs) or other addresses may be obtained and selectable links 308 to view the obtained clips may be included in the user interface 300. Selection of the link through an input device may activate a browser program or otherwise navigate to the clip for viewing on the sharing platform. In another example, selection of the link 308 to the sharing platform may display the clip in the content display area 302.

A selection menu 306 of the user interface 300 may be used to select a number and type of sharing platform searched to generate the heat map 304 and/or the links 308. Through the selection menu 306, the sharing platform from which the heat map 304 is generated may be limited to a particular sharing platform, to a selected plurality of sharing platforms, to sharing platforms associated with a user of the interface 300, to particular types of sharing platforms, and the like.

In some instances, the user interface 300 may be personalized for a particular user. For example, the interface may indicate which scenes in the first content item include one or more actors in which a user has indicated an interest. The interface may indicate the locations of certain clips in the first content item that are identified based on retrieved data associated with the additional content items. For example, the interface may indicate fight scenes, car chase scenes, scenes with singing, or scenes associated with sports such as dunk scenes, scoring scenes, or strong defensive plays. The type of scene may be identified based on titles or comments from the additional content items. For example, if a title of an additional content item is "great car chase," then a portion of the first content item that corresponds to that additional content item may be labeled as a car chase scene. The interface 300 may be generated to indicate any type of scene that a particular user has shown an interest in. For example, if the user has indicated that he or she is interested in boxing scenes, locations corresponding to that type of scene may be indicated in the heat map 304. Selection box 306 may include the various options that may be selected for displaying different types of highlights or scenes within the content item.

Figure 4:
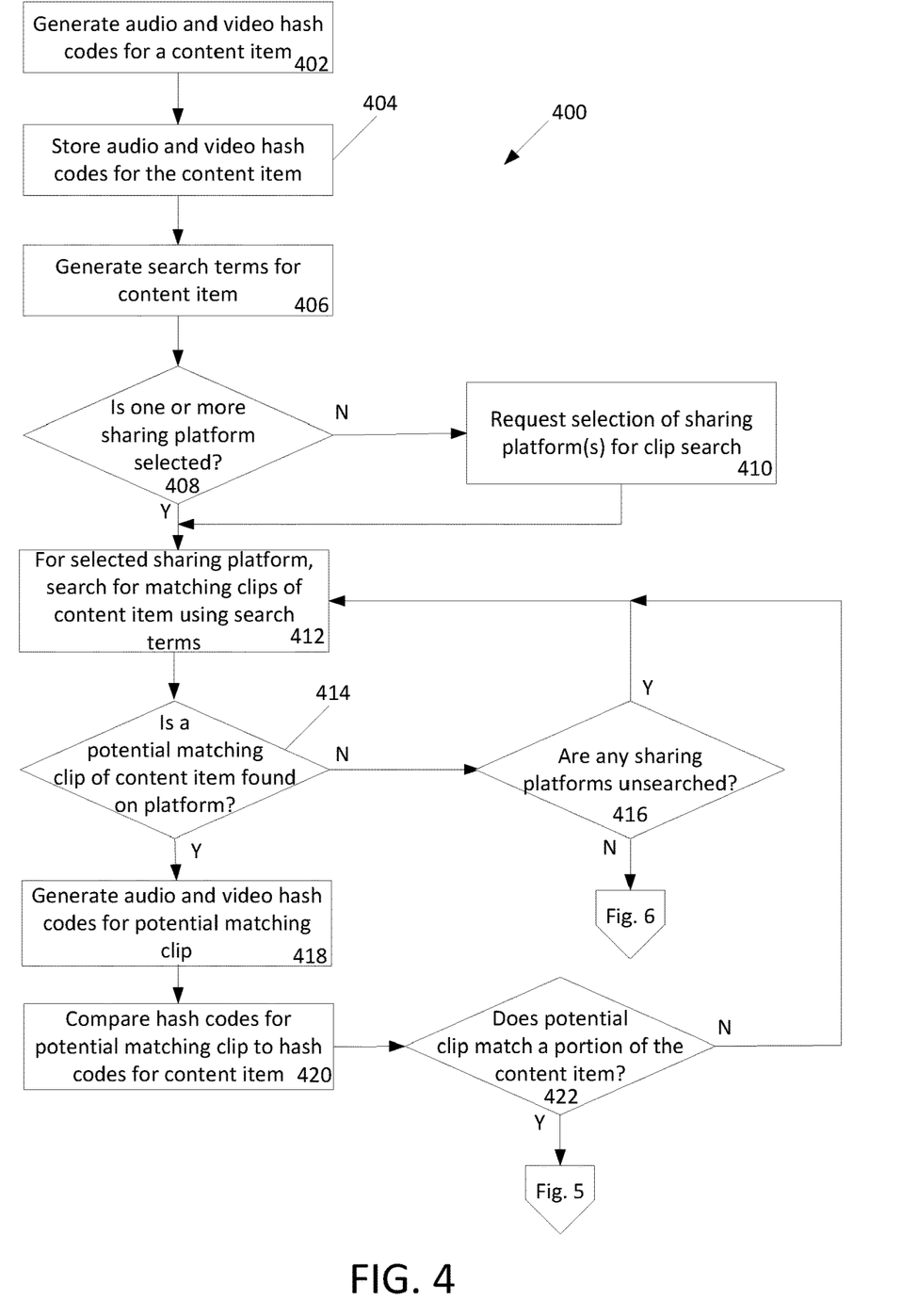
FIG. 4 is a flow chart showing an example method for identifying shared portions of a video content on one or more sharing platforms.

FIG. 4 is a flow chart showing an example method 400 for identifying shared portions of a video content on one or more sharing platforms. The method 400, or one or more operations of the method, may be performed by one or more computing devices or entities. For example, portions of the method 400 may be performed by components of the network 100 or the computing device 200. The method 400 or one or more steps thereof may be embodied in computer-executable instructions that are stored in a computer-readable medium, such as a non-transitory computer readable medium. The steps in this flow chart need not all be performed in the order specified and some steps may be omitted or changed in order.

At step 402, hash codes may be generated for one or more content items available through the communication network 100. For example, a content item may comprise a movie, a television program, or any other content comprising audio and/or video. In some instances, the content item may be stored on a computing device of the communication network 100. In other instances, the content item may be stored on a Digital Video Recorder (DVR) associated with the communication network 100. Regardless of the source of the content item, the hash codes generated for the content item may comprise separate hash codes for the video features of the content item and the audio features of the content item. For example, first hash codes may be generated for the video features, i.e., video hash codes, and second hash codes may be generated for the audio features, i.e., audio hash codes. In another example, a single hash code may correspond to both video and audio features. The hash codes may be generated using a hashing algorithm, or hashing function, such as a locality-sensitive hashing algorithm. When using a locality-sensitive hashing algorithm, similar inputs result in similar output hashes. For example, after inputting a high quality version of a content item and a low quality version of the content item to a locality-sensitive hashing algorithm, similar hashes are output for each of the versions of the content item.

The hashing algorithm may receive an input of a content item, i.e. video and/or audio, and, using a predefined hashing function, process the content item to output a hash value corresponding to the content item. The generated hash value, or hash, may have a smaller filesize than the content item. A plurality of hashes may be generated for various intervals of the content item, such as intervals of a predetermined length. For example, a respective audio hash code and a video hash code may be generated for each 15 second interval of the content item. In another example, the intervals may be different for audio hash codes and video hash codes. The time interval for hash generation may also be predefined or may be based on a length of the content item. Further, the time interval for the hash generation may be dynamic, i.e., the time interval may be shortened or extended as the content item is processed. For example, for a scene of a video with a large amount of action, the time interval may be shortened. The generated audio and video hash codes for the content item may be stored in step 404 for comparison to potential clips or portions of the content item obtained from sharing platforms discussed below.

In step 406, one or more search terms for identifying clips, portions, or highlights of the content item on one or more sharing platforms may be generated. For example, one or more components of the network 100 of FIG. 1 may generate the search terms based on information of the content item, such as the content item title or portions of the content item title, descriptions of the content item, actors or other participants in the creation of the content title, etc. Other types of search terms may also be generated, such as clip, image, or audio portions of the content item that can be compared to images or clips of the sharing platforms. In general, any text, image, or computer file associated with the content item may be generated as a search term for the content item.

In step 408, the network 100 may determine if one or more sharing platforms to be searched are selected or identified. As mentioned, sharing platforms may be any type of a database through which multimedia content may be shared with users of the database. For example, a sharing platform may be a video sharing website, a social media website that connects users into groups, smart phone applications, public databases stored on a network, etc. The sharing platforms may also be subsets or portions of a publicly available sharing platform. For example, FACE-BOOK™ may be selected as a searched platform, but limited to the content shared among an identified group of friends or family of a user of the network 100 as identified by the website.

The sharing platforms available for searching of clips of the content item may be identified prior to searching such platforms. For example, the network 100 may store one or more default sharing platforms to be searched for clips of the content item. In another example, several sharing platform options may be presented to a user or users of the network 100 for selection to tailor the searched platforms to the user's preferences. Thus, if no sharing platforms are identified, a request to select one or more sharing platforms to search for highlights or clips may be transmitted in step 410. Such a selection may be provided, in one example, through the selection menu 306 of the user interface 300 discussed above with reference to FIG. 3.

In step 412, searching of the selected sharing platforms may occur using the generated search terms associated with the content item. For example, a computing device may access the selected sharing platform and search for the search terms associated with the first content item (or a scene within the first content item), such as a title of the first content item, on a search engine associated with the sharing platform. In one particular example, the computing device may access YOUTUBE™ through a browser program and enter the title of the content item into a search bar or other search function within the website. Other methods to identify portions of content items may also be used, such as analyzing user comments to a clip, searching metadata associated with a clip, image or audio comparison of the clips to the search images or clips, and the like.

In step 414, the results of the search on a first sharing platform may be analyzed to determine if a potential matching clip or shared video is located on the selected sharing platform. If not, it may be determined if additional sharing platforms selected for searching are left unsearched in step 416. If yes, the next selected sharing platform may be accessed in step 412 using the search terms identified above. For example, if no results are returned from the search of YOUTUBE™, another sharing platform, such as FACE-BOOK™ may be accessed and a search within that platform may occur. If one or more potentially matching clips are found on the sharing platform, hash codes may be generated for a potentially matching clip at step 418. Like the hash codes for the first content item, the hash codes for the potentially matching clip may also comprise video feature hash codes and audio feature hash codes. The hash codes generated at step 418 may be generated in intervals as described in step 402 or may be in any time interval. The same hashing algorithm, or combination of hashing algorithms, may be used at step 402 and step 418. For video hash code generation, a hash code may be extracted for each frame within the time interval, or for selected frames, such as key frames.

At step 420, the hash codes generated for the content item and the potentially matching clip may be compared to determine that at least a portion of the potentially matching clip corresponds to at least a portion of the content item. For example, the matching clip may be identical to a portion of the content item, or comprise audio and/or video similar to the portion of the content item, which may be identified by a starting timestamp and an ending timestamp within the content item. Thus, the matching clip may be a highlight or portion of the content item. The one or more generated hash codes corresponding to the content item may be compared to the generated one or more hash codes corresponding to the matching clip to determine if the clip is a portion of the content item. The audio hash codes of the two content items may be compared and/or the video hash codes may be compared.

As mentioned, the hash codes do not need to be identical for the found clip to be a highlight of the content item. For example, by comparing the hash codes, a similarity percentage may be determined between all or a portion of the content item and the matching clip. The similarity percentage may indicate how similar the hash codes for the content item are to the hash codes for the matching clip. If the similarity percentage is above a threshold, such as ninety percent, the matching clip may be determined to comprise a portion of the content item. In this example, the similarity percentage may be determined by calculating a Hamming distance between all or a portion of the hash codes for the content item and all or a portion of the hash codes for the matching clip. A Hamming distance indicates a number of positions at which the hash codes are the same, and/or a number of positions at which the hash codes are different.

In another example, images or clips of audio of the potential matching clip may be compared to the video content to determine if the clip matches a portion of the video content. Thus, rather than generate hash codes for the potential matching clip and the video content, the network 100 may perform an image comparison from the matching clip to the video content to determine a match. A similar technique may be performed for audio clips from the potential matching clip.

The video hash codes and the audio hash codes may be weighted differently in determining whether the matching clip comprises a portion of the content item. For example, hash codes that are generated from a source with a better signal quality may be given higher weight. In another example, more weight may be given to audio hash codes that were generated from audio that contained very little noise. The noise level in an audio signal may be measured using A-weighting, ITU-R 468 weighting, or any other weighting algorithm. In addition, if it is determined that the video in the content item or the video in the matching clip is static, i.e., unchanging, the device may give more weight to the audio hash codes.

If no matching clip to the content item is determined in step 422, the method 400 may return to step 412 to select another video clip from the sharing platform to compare with to the video content. If the matching clip is determined to match with the content item in step 422, the method 500 of FIG. 5 may be executed to obtain popularity metadata of the clip and determine a location of the clip in the content item.

Figure 5:
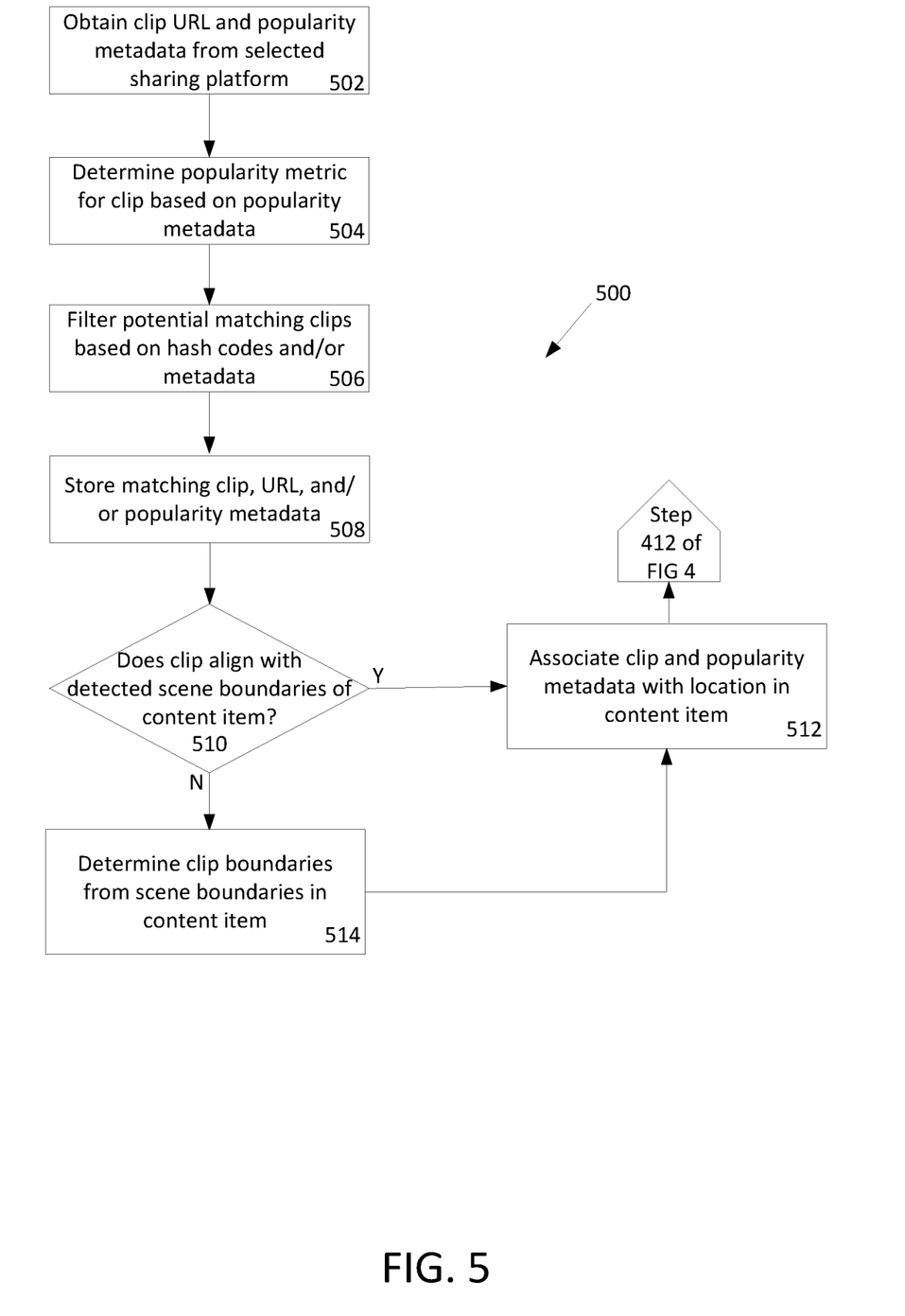
FIG. 5 is a flow chart showing an example method for obtaining popularity metadata of highlights of a content item and determining locations of highlights in a content item.

FIG. 5 is a flow chart showing an example method 500 for obtaining popularity metadata of highlights of a content item and determining locations of highlights in a content item. The steps of the method 500 may be executed for each identified clip from a sharing platform that potentially matches with the content item of the communication network 100. Thus, at step 502, popularity metadata corresponding to the matching clip on the sharing platform may be imported or otherwise obtained. The popularity metadata may be retrieved from a social media service or a video sharing service corresponding to the matching clip. Popularity metadata corresponding to the matching clip may comprise, for example, a title, description, comments, tags, number of views, number of likes, number of shares, category, thumbnail picture, subtitles, closed captions, or creation date. Further, the type of popularity metadata may be particular to the sharing platform from which the matching clip is obtained. For example, on a social media website or application, the popularity metadata may be the number of likes or approvals for the clip. In other sharing platforms, the popularity metadata may include the number of views of the clip and/or the number of comments associated with the clip.

The popularity of the matching clip may be determined by calculating a popularity metric for the matching clip in step 504. The popularity metric may be calculated based on, for example, a number of views, likes, or shares of the matching clip. For example, if the matching clip was retrieved from a video sharing service that includes a number of views for each shared item, the number of views for the matching clip may be used as the popularity metric. The popularity metric may be based on natural language processing results obtained from analyzing the description, title, comments, or other text associated with the matching clip. The natural language processing results may include a sentiment classification, a summary, or other results. For example, if the text associated with the matching clip has a positive sentiment classification it may be given a higher popularity metric. The popularity metric may also include popularity metadata from a variety of sharing platforms to aggregate the sentiments or opinions of the matching clip over more than one set of metadata. Also, the popularity metric may be normalized, or adjusted, based on the availability, uploading time, and/or other factors corresponding to the matching clip. For example, if the matching clip was uploaded at an earlier date than a third content item, the matching clip may have more views because it has been available for viewing for a longer period of time. In this example, the popularity score of the matching clip may be reduced because it has been available for viewing for a longer period.

At step 506, the matching clips may be filtered to remove those clips that may not be popular enough to generate an entry in the heat map 304. For example, two or more of the additional content items may be determined to be identical or nearly identical. For example, the two or more content items may be determined to be nearly identical by generating and comparing hash codes for the two or more content items. In this example, if the hash codes are compared and satisfy a predetermined similarity threshold, the two or more content items may be determined to be sufficiently similar, and, as a result, a single content item of the two or more content items may be selected as a representative content item. When two or more of the content items are determined to be nearly identical, a single content item may be selected as a representative video. Metadata associated with the two or more nearly identical content items may be combined. For example, a number of views associated with each of the two or more nearly identical content items may be summed.

Further, although discussed in step 506, some systems may also perform filtering of the matching clips prior to generating hash codes for the clip or obtaining the popularity metadata for the clips. For example, searching using the content title alone may return results that merely mention content title with no associated video or multimedia clip. Such results from the search of the sharing platform may be discarded from the potentially matching results of the search. In another example, searched videos having less than a threshold number of views or shares may be filtered out or if they are responsive to less than a threshold number of provided search terms. In yet another example, the searched videos may be filtered based on a size or length such that videos having a size or length above a predetermined threshold may be filtered out.

At step 508, the matching clip, network address associated with the clip (such as the URL), and the obtained popularity metadata may be stored for use by the network 100 for inclusion in the user interface 300. At step 510, it may be determined if the matching clip aligns with detected scene boundaries of the content item. Detection of scene boundaries of the content item are discussed in more detail below. In general, however, the boundaries between scenes may be detected for the content item. Aligning a matching clip to those scene boundaries may provide a more uniform aggregation of clips to aid in determining the popularity of the clips. For example, an uploaded clip to the sharing platform may not conform to the beginning and/or ending of a scene. Rather, the clip may begin or end slightly after or before the scene boundary. In such cases, the clip may be associated with the closest scene boundaries in the content item that matches the clip in step 514. By aligning the clip to common scene boundaries in the content item, aggregating popularity metadata for the clips from the searched sharing platforms may become more uniform as clips are now arranged by common scene boundaries.

If the clip aligns with determined scene boundaries in the content item or is adjusted to alight with the scene boundaries, the matching clip and obtained popularity metadata may be associated with a location in the content item at step 512. For example, the metadata of a highlight may be stored with an indicator of a time in the content item, or a time interval from the beginning of the content item, to indicate a location within the content item that the highlight occurs. In an example, the indicator may include a beginning timestamp and an ending timestamp. A determined popularity metric for the matching clip may also be stored with the metadata. The method 500 may then return to step 412 of method 400 of FIG. 4 to obtain the next potentially matching clip from the sharing platform.

Figure 6:
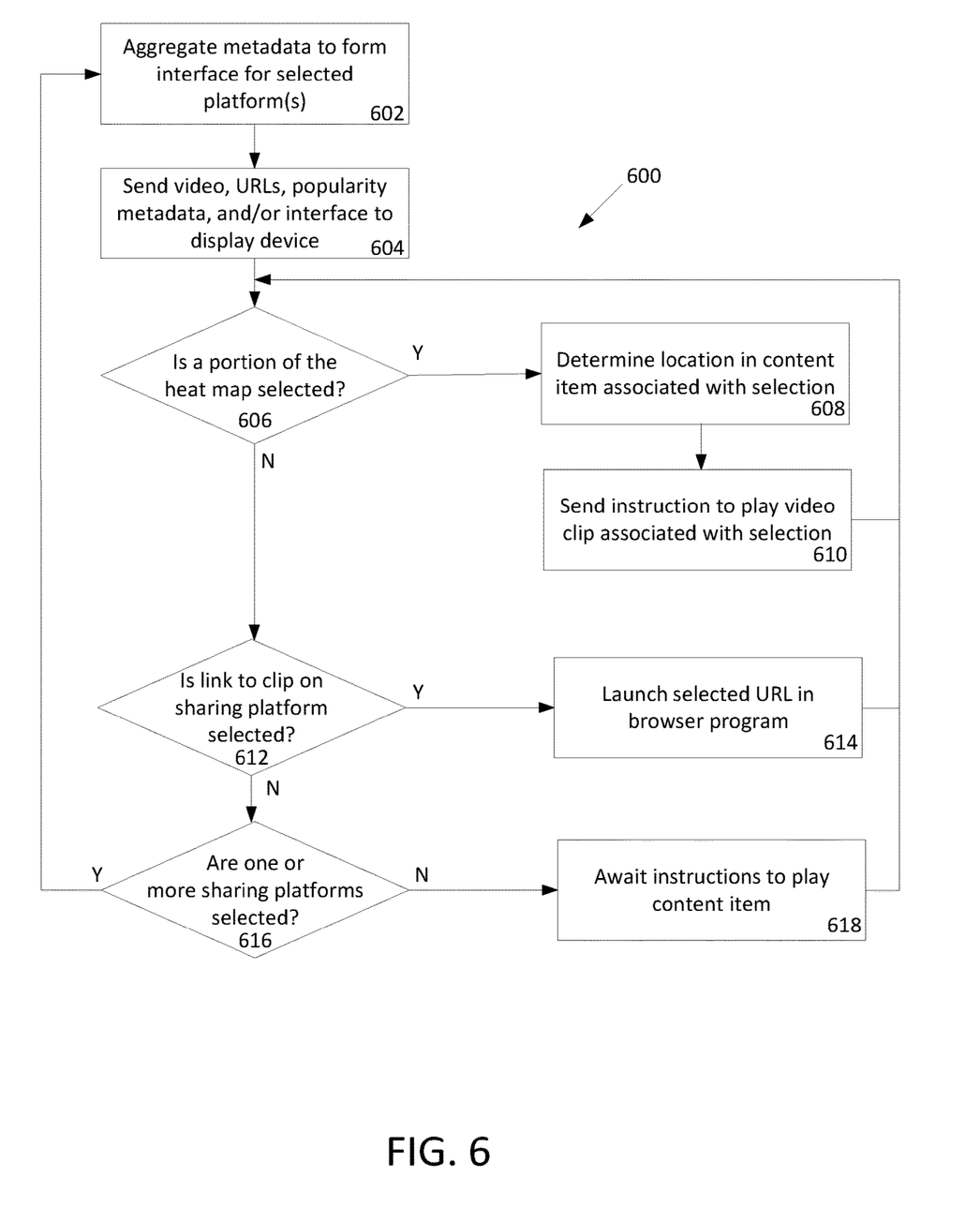
FIG. 6 is a flow chart showing an example method for providing navigation options to highlights in a content item.

Returning to method 400 of FIG. 4, after all of the potentially matching clips from each of the selected sharing platform is identified and matched to a location within the content item (see step 416), method 600 of FIG. 6 may be executed. FIG. 6 is a flow chart showing an example method 600 for providing navigation options to highlights in a content item through user interface 300. Beginning in step 602, the popularity metrics corresponding to different portions or highlights of the content item may be aggregated to generate an interface 300 that indicates locations, or clips, within the content item that have been frequently shared and/or that are popular among viewers. The interface 300 may be generated based on a count of the number of other videos that are associated with each location in the content item. For example, portions of the content item that have been shared a threshold amount of times may be displayed in the interface 300. The interface 300 may be generated based on a popularity metric for each of the other videos associated with the content item and may provide a relative location within the content item of the popular highlights. For example, a heat map 304 may be generated and displayed based on a combination of the number of videos and the popularity of each of the videos associated with each location.

At step 604, the content item, obtained matching clips for the content item, popularity metadata for the matching clips, URLs for the matching clips, and/or the user interface 300 may be generated and/or transmitted to a display device for display. An additional content item may be generated using the matching clips for the content item. For example, portions of the content item may be extracted and merged to form a highlights reel of the content item. In this example, the portions of the content item to extract may be determined based on the timestamps of the matching clips. Portions of the content item that are shared and/or viewed frequently may be determined, and then aggregated to form the additional content item.

Regardless of the items transmitted to the display device, a user of the device may select portions of the user interface 300 discussed above to interact with the content item and/or the clips or highlights of the content item. At step 606, it is determined if a portion of the heat map 304 associated with the content item is selected. If a portion is selected, a location in the video content item associated with the selection is determined at step 608 and an instruction to play the video clip of the selected portion is transmitted at step 610 and the method returns to step 606 to determine if another portion of the heat map is selected. The location within the content item may be based on which vertical bar of the heat map 304 is selected. If a portion of the heat map 304 is not selected, it may be determined if a link 308 to view a clip of the content item is selected. If selected, a browser program of the computing device may be launched and a URL associated with the selected link may be inserted into the browser to viewing the clip on the sharing platform. It may further be determined at step 616 if one or more sharing platforms are selected through the selection menu 306 of the user interface 300. As discussed above, selection of the sharing platform used to determine highlights of the content item may alter the results displayed in the heat map 304 of the content item. If the selection menu 306 is selected at step 616, the method 600 returns to step 602 to re-aggregate the metadata of the matching clips to generate a new heat map 304. In some instances, selecting one or more sharing platforms through the selection menu 306 may return to method 400 to begin the process of searching for matching clips on the selected sharing platforms. If no sharing platforms are selected, the user interface 300 waits for instructions to play the content item at step 618.

Figure 7:
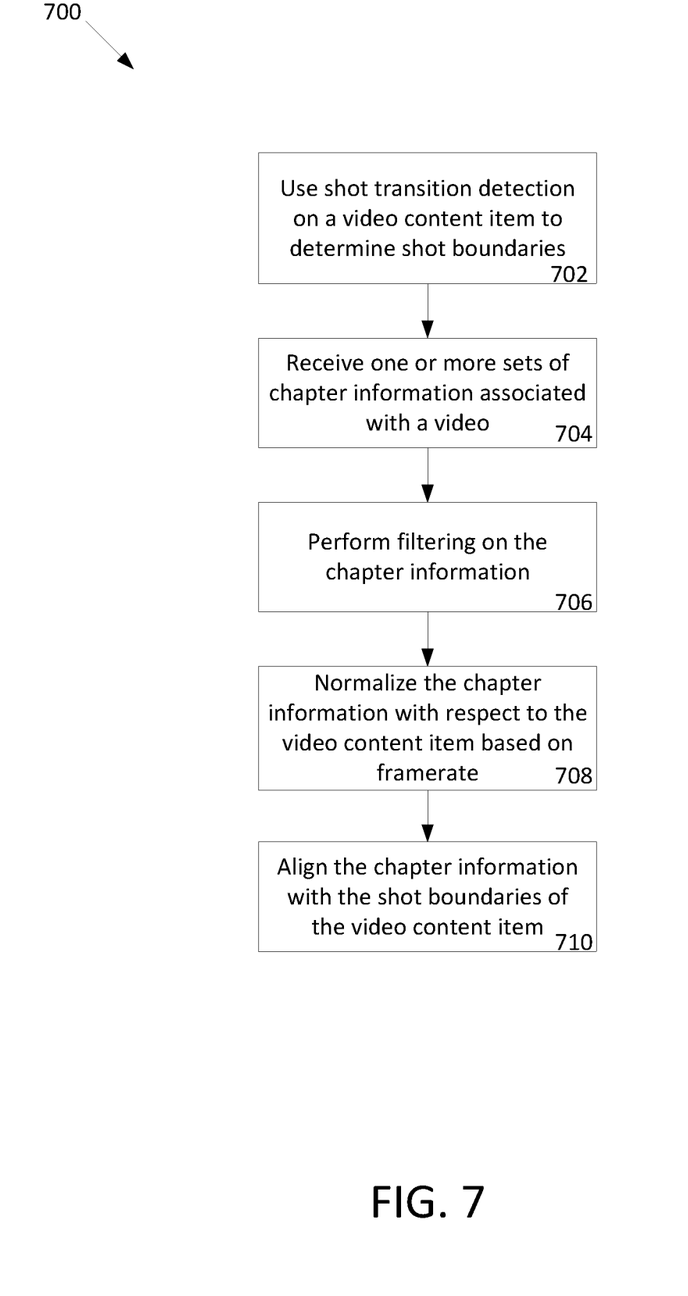
FIG. 7 is a flow chart showing an example method for adding chapter information to a content item with filtering.

In addition to providing locations and navigation to highlights or clips within the content item, the heat map 304 may also include chaptering information or navigations to chapters within the content item. As described, users may utilize chapters to navigate various portions of a video, such as when viewing a video on a laser-based storage medium. Such chaptering information is not typically included in content items available through a communication network 100. FIG. 7 is a flow chart showing an example method 700 for adding chapter information to a content item of a communication network 100. Chapter information may be added to the interface 300 generated, in one example, such that titles of one or more chapters may be displayed in the interface, perhaps in the heat map 304 associated with the content item. Similar to above, the method 700 or one or more steps thereof may be performed by one or more computing devices or entities, may be embodied in computer-executable instructions that are stored in a computer-readable medium, may be performed in the order specified, or some steps may be omitted or changed in order.

At step 702, a device may perform shot transition detection on a content item comprising video. Shot transition detection may be used to identify the different shots or scenes in the video and at what time within the content shot transitions occur. Any kind of shot transition detection may be used to identify the scenes in the video. Shot transition detection may be based on approaches that use visual, audio, text, audio-visual, visual-textual, audio-textual, or other hybrid approaches. Shot boundary detection can be based on closed caption analysis. For example, successive frames, or a series of frames, in the video may be compared, and, if the frames satisfy a threshold difference, the frames may be determined to be a shot transition. In another example, a brightness value may be determined for two or more frames, and, if a change in the brightness value satisfies a threshold, the frames may be determined to be a shot transition. In still another example, a Group of Pictures (GOP) within the video stream may be analyzed to detect the shot transition, such as detecting I frames within a Movie Picture Experts Group (MPEG) video stream.

At step 704, chapter information associated with a different version of the content item may be retrieved. The source that the chapter information is based on may be any type of content item. The chapter information may include a title for each chapter, time stamps for each chapter, a frame rate of the video that the timestamps are from, and the type of media from which the chapter information is obtained, such as HD or SD, DVD, or Blu-Ray. For example, a content item may comprise a Video On Demand (VOD) content item stored on a gateway interface device 111. Chapter information for the stored content item received at step 520 may correspond to a DVD version of the content item. Metadata from the DVD content item, including the framerate of the DVD content item and the chapter information, may be uploaded to a repository, such as an online repository, e.g., a website, of content item metadata. The metadata may then be obtained from the repository for use in chaptering a content item. However, while both the VOD content item and the DVD content item may be the same movie: they may be in different formats, have different framerates, and/or have a different length due to the deletion or addition of content at the beginning or the end of the content item. In one example, either of the content items may be modified, for example to match a guidance rating such as PG when shown on daytime television. For any number of reasons, the VOD and DVD versions of the content may vary in formats, framerates, and/or lengths.

In some instances, two or more sets of chapter information for a content item may be retrieved from a website or other storage location that stores chapter information for content items. The two or more sets of chapter information may include chapter information from a DVD, HD or SD, Blu-Ray, or other version of the content item. Each set of chapter information may represent a different segmentation of the content item into chapters. For example, some sets of chapter information may include more chapters than others. Some sets of chapter information may have similar or same chapters, but the chapters may start and/or end at different times. For example, a first set of chapter information may indicate that a particular chapter begins at the 1:35 mark in the video content, while a second set of chapter information may indicate that the chapter begins at the 1:42 mark within the content. Sets of chapter information may include metadata such as a date of creation or release, duration of the associated content item, usage, information indicative of the chapter information's quality, type of media, number of downloads of the set of chapter information, or the name of a user or the name of a creator associated with the information. The chapter information may be obtained from a repository of chapter information that is hosted on a website. The chapter information may also be obtained directly from a physical medium such as a DVD, HD or SD, Blu-Ray, or other version of the content item.

At step 706, filtering on the chapter information may be performed. In some embodiments, filtering may serve to reconcile the one or more sets of chapter information into one final set. For example, filtering may result in the selection of one set of chapter information from the one or more sets. The selected or reconciled set may then be used to provide chapters to a stored content item. The sets of chapter information may be filtered based on various criteria, such as a quality or frame rate specified in the chapter information, or a popularity of the set of chapter information. The popularity of a set of chapter information may be a number of times the set has been downloaded from the repository, a number of likes or upvotes corresponding to the set of chapter information, or another measure of popularity corresponding to the chapter information. A set of chapter information that has a highest determined quality or frame rate may be selected for application to the video content.

At step 708, the selected chapter information may be normalized with respect to the content item based on the frame rate associated with the chapter information and the frame rate associated with the content item. The frame rate associated with the chapter information may have been retrieved with the chapter information. The frame rate associated with the content item may be known, or may be determined by analyzing video portion of the content item. For example, a header of the content item may indicate a frame rate of the content item such that the frame rate is known. Analysis of the video portion, such as an analysis of the individual frames of the video, may provide an estimated frame rate of the content item.

At step 710, time stamps of the chapter information received from the repository may be aligned to the content item. In particular, chapter timestamps within the chapter information obtained from the repository may be aligned to a different shot boundary. Due to differences in the chapter information's source and the content item, there may be multiple possible alignments. To select one of the possible alignments, an optimal alignment may be determined, for example, by minimizing a cost function of:

$$\text{cost} = \min_{\text{offset}} \sum_{\text{offset}=0}^{\text{offset\_limit}} \sum_{i=0}^{\text{\# of chapters}} (Chapter_i - \text{Offset} - Shot_{nearest_i})^2$$

Inputs to the cost function may comprise the original timestamps for each chapter ($Chapter_i$), the offset, and the shots determined by shot transition detection. The cost function may determine, for each of the chapter time stamps, detected shot transitions that have timestamps closest to the chapter time stamp within a neighborhood of shot transitions. Multiple potential alignments may be determined, each with their own displacement ($Chapter_i - Shot_{nearest_i}$) between shot detection timestamps and chapter boundary timestamps, because the chapter boundary may not exactly be aligned with the shot boundary. A summation of the difference between shot detection timestamps and chapter boundary timestamps may be determined to calculate the cost function. An optimal alignment may then be determined, from the multiple potential alignments, by selecting an optimal offset value that minimizes the number of selected shot transitions that exceed chapter boundaries.

In addition to aligning chaptering information with a content item, the scene detection may be utilized during the highlight or clip identification of the content item discussed above. In particular, matching clips to the content item may be obtained from one or more sharing platforms and applied to locations within the content item. However, the matching clip may not align with scene boundaries as determined within the content item. In such circumstances, the location within the content item for the matching clip may be aligned with a determined beginning of a scene and a determined end of a scene. In this manner, scene detection may aid in applying one or more matching clips or highlights to a content item.

Figure 8:
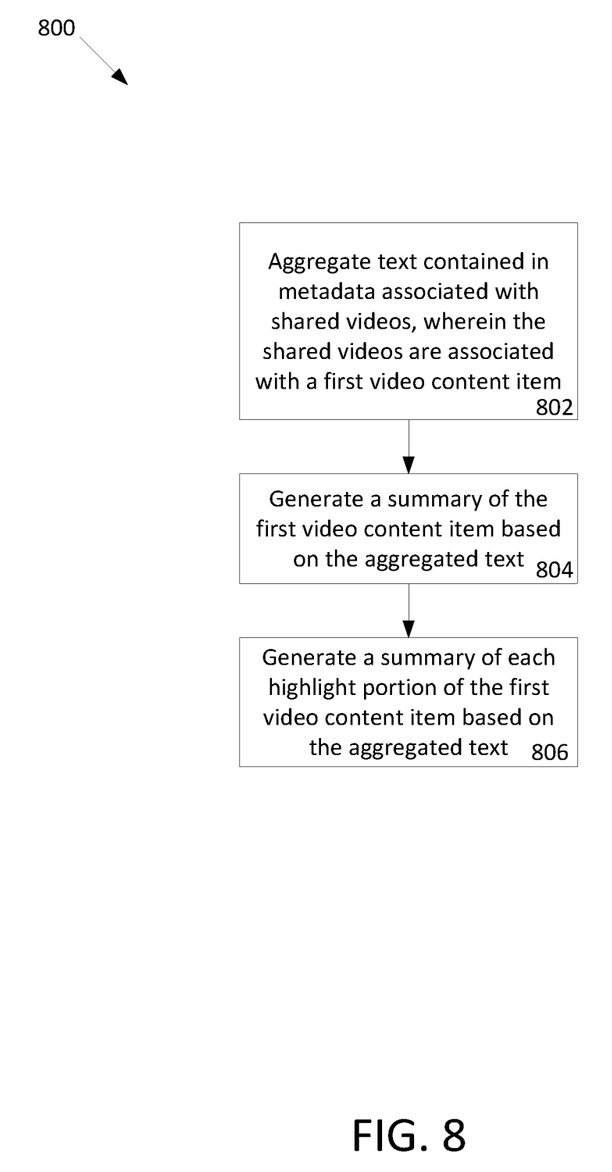
FIG. 8 is a flow chart showing an example method for generating a summary of a content item.

FIG. 8 is a flow chart showing an example method 800 for generating a summary of a content item. Similar to above, the method 800 or one or more steps thereof may be performed by one or more computing devices or entities, may be embodied in computer-executable instructions that are stored in a computer-readable medium, may be performed in the order specified, or some steps may be omitted or changed in order.

At step 802, metadata belonging to shared videos that are associated with a first content item may be aggregated. The shared videos may be retrieved by performing a search on a video sharing website or on social media. In this example, the search terms may comprise keywords associated with the first content item, such as a title, episode title, series title, actor in the content item, or director of the content item. The metadata may comprise information similar to the metadata described above at step 450 in FIG. 4. For example, the metadata may comprise a title of a shared video, comments on a shared video, a summary of the shared video, or other information associated with the shared video.

At step 804, a summary of all or a portion of the first content item may be generated using the aggregated metadata. Automatic summarization may be used to generate a summary of the metadata. For example, extraction-based, abstraction-based, and aided summarization may be used to generate the summary. Key phrases from the metadata may be extracted and included in the summary. Portions of the metadata may be paraphrased using natural language generation technology. Additionally, machine learning techniques from information retrieval or text mining may be used to generate the summary.

At step 806, a summary of one or more highlight portions of the first content item may be generated. For example, a summary of a highlight portion of the first content item may be generated based on metadata associated with one or more shared content items comprising the highlight portion. For example, a second content item associated with the first content item may be retrieved from a content sharing service. The second content item may be determined to comprise a portion of the first content item. A summary of the second content item may be generated and stored, along with an indicator of the portion of the first content item corresponding to the summary. The summary may then be displayed. For example, after the portion of the content item is displayed, the summary may be overlaid on the content item. In another example, a listing of highlight portions of the first content item may be displayed, and, for each highlight in the listing, a summary of the highlight of the content item may be displayed. In some examples, step 804 or step 806 may be skipped. For example, a summary of the content item may be generated, but a summary of each highlight of the content item might not be generated.

Although examples are described above, features and/or steps of those examples may be combined, divided, omitted, rearranged, revised, and/or augmented in any desired manner. Various alterations, modifications, and improvements will readily occur to those skilled in the art. Such alterations, modifications, and improvements are intended to be part of this description, though not expressly stated herein, and are intended to be within the spirit and scope of the disclosure. Accordingly, the foregoing description is by way of example only, and is not limiting.

What is claimed is:

1. A method comprising:
   accessing, by a computing device and via a plurality of content sharing services, a video clip that corresponds to a portion of a video content item; and
   causing, by the computing device, output of a user interface comprising:
      a timeline corresponding to the video content item, wherein the timeline indicates popularity of different portions of the video content item, and wherein the popularity is based at least in part on a quantity of interactions, on the plurality of content sharing services, with the video clip;
      a selectable option to limit the timeline to popularity based on a particular content sharing service of the plurality of content sharing services; and
      a selectable link to the video clip on at least one of the plurality of content sharing services.

2. The method of claim 1, wherein the accessing the video clip comprises selecting the video clip based on a similarity between:
   a first hash code corresponding to the video content item; and
   determining a second hash code corresponding to the video clip.

3. The method of claim 1, wherein the accessing the video clip comprises:
   obtaining a respective quantity of interactions, on each of the plurality of content sharing services, with the video clip.

4. The method of claim 1, wherein the user interface further comprises:
   a plurality of links, for at least one of the plurality of content sharing services, to different portions of the video content item.

5. The method of claim 1, wherein the accessing the video clip comprises:
   determining one or more search terms corresponding to the video content item; and
   sending the one or more search terms to the plurality of content sharing services.

6. The method of claim 1, wherein the user interface further comprises:
   a plurality of links, for at least one of the plurality of content sharing services, to different portions of the video content item, wherein each link comprises information indicating a respective quantity of interactions on a respective content sharing service of the plurality of content sharing services.

7. The method of claim 1, further comprising:
   determining a sentiment classification based on the quantity of interactions with the video clip; and
   determining, based on the sentiment classification, a popularity metric associated with a time portion, of the video content item, that corresponds to the video clip.

8. The method of claim 1, wherein the quantity of interactions are associated with at least one of a view, a like, a share, or a comment.

9. An apparatus comprising:
   one or more processors; and
   memory storing instructions that, when executed by the one or more processors, cause the apparatus to:
      access, via a plurality of content sharing services, a video clip that corresponds to a portion of a video content item; and
      cause output of a user interface comprising:
         a timeline corresponding to the video content item, wherein the timeline indicates popularity of different portions of the video content item, and wherein the popularity is based at least in part on a quantity of interactions, on the plurality of content sharing services, with the video clip;
         a selectable option to limit the timeline to popularity based on a particular content sharing service of the plurality of content sharing services; and
         a selectable link to the video clip on at least one of the plurality of content sharing services.

10. The apparatus of claim 9, wherein the instructions, when executed by the one or more processors, cause the apparatus to access the video clip by selecting the video clip based on a similarity between:
    a first hash code corresponding to the video content item; and
    determining a second hash code corresponding to the video clip.

11. The apparatus of claim 9, wherein the instructions, when executed by the one or more processors, cause the apparatus to access the video clip by:
    determining one or more search terms corresponding to the video content item; and
    sending the one or more search terms to the plurality of content sharing services.

12. The apparatus of claim 9, wherein the user interface further comprises:

a plurality of links, for at least one of the plurality of content sharing services, to different portions of the video content item, wherein each link comprises information indicating a respective quantity of interactions on a respective content sharing service of the plurality of content sharing services.

13. The apparatus of claim 9, wherein the instructions, when executed by the one or more processors, further cause the apparatus to:
 determine a sentiment classification based on the quantity of interactions with the video clip; and
 determine, based on the sentiment classification, a popularity metric associated with a time portion, of the video content item, that corresponds to the video clip.

14. A non-transitory computer-readable medium storing instructions that, when executed, cause:
 accessing, by a computing device and via a plurality of content sharing services, a video clip that corresponds to a portion of a video content item; and
 causing output of a user interface comprising:
  a timeline corresponding to the video content item, wherein the timeline indicates popularity of different portions of the video content item, and wherein the popularity is based at least in part on a quantity of interactions, on the plurality of content sharing services, with the video clip;
  a selectable option to limit the timeline to popularity based on a particular content sharing service of the plurality of content sharing services; and
  a selectable link to the video clip on at least one of the plurality of content sharing services.

15. The non-transitory computer-readable medium of claim 14, wherein the instructions, when executed, cause the accessing the video clip by selecting the video clip based on a similarity between:
 a first hash code corresponding to the video content item; and
 a second hash code corresponding to the video clip.

16. The non-transitory computer-readable medium of claim 14, wherein the instructions, when executed, cause the accessing the video clip by:
 determining one or more search terms corresponding to the video content item; and
 sending the one or more search terms to the plurality of content sharing services.

17. The non-transitory computer-readable medium of claim 14, wherein the user interface further comprises:
 a plurality of links, for at least one of the plurality of content sharing services, to different portions of the video content item, wherein each link comprises information indicating a respective quantity of interactions on a respective content sharing service of the plurality of content sharing services.

18. The non-transitory computer-readable medium of claim 14, wherein the instructions, when executed, further cause:
 determining a sentiment classification based on the quantity of interactions with the video clip; and
 determining, based on the sentiment classification, a popularity metric associated with a time portion, of the video content item, that corresponds to the video clip.

* * * * *